F. W. NALL.
AMUSEMENT DEVICE.
APPLICATION FILED APR. 4, 1908.

931,139.

Patented Aug. 17, 1909.
5 SHEETS—SHEET 2.

Witnesses:
Inventor
Fredric W. Nall
By James N. Ramsey
Attorney

F. W. NALL.
AMUSEMENT DEVICE.
APPLICATION FILED APR. 4, 1908.

931,139.

Patented Aug. 17, 1909.
5 SHEETS—SHEET 3.

Witnesses:

Inventor
Fredric W. Nall
By James N. Ramsey
Attorney

UNITED STATES PATENT OFFICE.

FREDRIC W. NALL, OF DEARBORN, MICHIGAN.

AMUSEMENT DEVICE.

No. 931,139.　　　　　Specification of Letters Patent.　　　Patented Aug. 17, 1909.

Application filed April 4, 1908. Serial No. 425,232.

*To all whom it may concern:*

Be it known that I, FREDRIC W. NALL, a citizen of the United States, residing at Dearborn, in the county of Wayne and State of Michigan, have invented certain new and useful Improvements in Amusement Devices, of which the following is a specification.

My invention relates to amusement apparatus for use in pleasure resorts, the object being to produce a novel sensation in connection with a ride, and to provide such apparatus as will produce such a sensation with safety, and without discomfort, to the passengers.
My invention consists in a car comprising a truck having a passenger carrying body rotatably mounted thereon, and a curved track for the truck to run on having rails adapted to engage with the body to rotate it when the truck runs on the track, as well as in the parts and in the details of construction and arrangement of parts as will hereinafter be more fully described and claimed.

In the drawings:
Fig. 3 is a plan view,
and Fig. 4 is a front elevation of the higher part of the construction illustrated in perspective in Fig. 1.
Fig. 5 is a plan view,
and Fig. 6 is a front elevation of the lower part of the construction illustrated in perspective in Fig. 1.

As illustrated in the drawings, the inclined track comprises supporting rails 1 with their width disposed laterally of the track, and guiding rails 2 at the sides of the track within their width disposed vertically, the supporting rails being carried on trans-
verse beams 3, preferably in sets of two, embracing, at the sides, posts 4, which posts 4 are preferably spaced some distance outside the guiding rails 2. Separate short posts 5 are provided for supporting the guiding rails 2, and braces 6 embrace both the posts 4 and 5 near their upper ends. The entire structure, thus composed of the supporting rails 1, guiding rails 2, beams 3, posts 4 and 5 and braces 6 and 7, being rigidly secured together, the supporting rails 1 and guiding rails 2 are maintained in fixed position relative to each other, and, being uniformly spaced apart throughout the length of the track, form continuous guiding means for the car 8, which comprises a truck 9, preferably of rectangular formation and having, located near each of its corners, guiding wheels 10, journaled in the casings 11 bolted to the rectangular truck frame and incidentally reinforcing it at its corners. The guiding wheels 10 thus mounted, two on each side of the car, are of the proper distance apart to all simultaneously engage with the laterally disposed guiding rails 2 and roll therealong.

The rectangular truck frame 9 is preferably constructed with each of its sides comprising spaced apart members 12 and 13, between which spaced apart members are located spacing members 14, bolted to the spaced apart members, securing them rigidly with respect to each other, and forming brackets for mounting the supporting wheels 15. At the front end of the car these spacing members are located with their front ends flush with the front ends of the spaced apart members, and a beam 16 extends across the front of the truck and is secured to the ends of the spaced apart members comprising the sides of the truck, the junction here being reinforced by the spacing members or brackets 14, to which the front beam 16 is also bolted. A beam 17 extends across the rear of the truck, in the same manner as the beam 16 extends across the front of the truck, and is secured to the rear ends of the spaced apart members 12 and 13 comprising the sides of the truck. The supporting wheels 15 are journaled in stocks 18, which are pivoted to the spacing members or brackets 14 to swing laterally, so that the supporting wheels 15 constitute caster wheels trailing behind the brackets 14. For this reason the brackets 14 to which the stocks of the rear supporting wheels are pivoted are spaced forwardly from the rear ends of the spaced apart members 12 and 13 and additional reinforcing brackets 19 are placed at the junctions of the rear beam 17 and the spaced apart members to reinforce them. The stocks 18 and brackets 14 are so proportioned that the supporting caster wheels 15 are positioned between the spaced apart members 12 and 13 and adapted to strike against the inwardly facing sides of these members and be limited in their lateral swinging movement thereby, the sides of the members, where the wheels come in contact, being preferably faced with metal plates 20.

In addition to the rigid construction of the truck frame, as above described, a spider 21 is secured on the truck frame to reinforce it and form a support for the passenger carrying body 22. This spider 21 has four members extending at right angles to each other horizontally from their central junction, then bent upward to extend vertically, and then bent to again extend horizontally, the last horizontal part of two of the members resting on the upper surfaces of respective sides of the truck frame, and the corresponding parts of the other two members resting on the upper surface of the front beam 16 and of the rear beam 17, respectively, while the lower horizontal parts of the members have their lower sides flush with the lower surface of the truck frame. Bolts are passed vertically through the truck frame and the horizontal parts of the spider lying on the upper surfaces of the truck frame, and other bolts are passed horizontally through the sides of the truck frame and through the vertical parts of the spider. In the center, the spider has an opening through which a pivot pin 23 passes, and which pivot pin has a head bearing on the lower side of the spider. Concentric to this opening and the pivot pin 23, a bearing ring 24 is rigidly secured to the spider through arms and lugs on the ring corresponding to the members of the spider. The bearing ring has a central hub with an opening through which the pivot pin 23 may pass, and preferably a pin 25 is passed through the hub and through the pivot pin 23 to prevent the pivot pin 23 from turning. This bearing ring 24 has an annular groove in which balls 26 are placed, and a second bearing ring 27, with an annular groove corresponding to the groove in the first bearing ring 23 and with arms and a hub similar to those of the bearing ring 24, in which hub is an opening for the pivot pin 23 to pass through, is inverted over the first bearing ring 24, receiving the balls 26 in its annular groove, so that it is adapted to turn on the pivot pin 23 and bear on the balls 26. A second spider 28, constituting the frame of the body, has members extending at right angles to each other, the same as do the members of the spider 21, and bent vertically upward, then horizontally, then vertically upward again. This second spider is rigidly secured to the arms of the second bearing ring 27 with the pivot pin 23 extending through a central opening in it, above which, around the pivot pin, is a washer 29 forming a bearing for a nut 30, on the pivot pin 23, provided with a suitable locking device, so that the pivot pin 23, while forming a pivot, also will hold the bearing rings 24 and 27 together and retain the balls 26 in the annular grooves.

Where the arms of the spider 28 are bent vertically and then horizontally, the horizontal parts thus formed lie over the truck frame, and on them is secured an annular seat 31, of width substantially the same as their length. Interiorly of the lower vertical parts of the spider, a shell 32 is secured, forming a circular wall for the lower part of the passenger carrying body 22, and a floor 33 is supported on the lower horizontal parts of the spider, thus completely closing the lower part of the passenger carrying body 22. This lower part forms a space to be occupied by the lower extremities of the passengers. Preferably a suitable cap 34 is secured to the floor 33 to cover the upper end of the pivot pin 23 and the nut 30 and its locking device. Exteriorly of the upper vertical parts of the spider 28, a larger circular shell 35 is secured to these parts, forming a circular wall for the upper enlarged part of the car body, and a back for the annular seat 31. The seat 31 and its back thus formed are preferably suitably upholstered. An angle iron 36, bent to form a complete circle, fits outside the shell 35 and is bolted therethrough to the upper end parts of the members of the spider 28, forming the rim of the passenger carrying body, reinforcing it and constituting means for attaching the standards 37, which support a circular hand rail 38 at a suitable height above the rim of the body.

Extending around the shell 35 at the bottom is the engaging ring 39 which is bolted through the shell 35 to the vertical parts of the members of the spider 28 adjacent to the annular seat 31. This engaging ring 39 is of sufficient strength to render the passenger carrying body thoroughly rigid, relieving the shells 32 and 35 of all of the strain incident to the operation of the device, and thus adding to the safety of its operation and to its durability. The members of the spider 28 are also reinforced by braces 40, extending diagonally from the vertical parts to the horizontal parts of the members under the annular seat 31. In addition to rendering the passenger carrying body thoroughly rigid, as above described, the engaging ring 39 is utilized to engage with the rail 41, which is mounted adjacent to the track for causing the passenger carrying body to rotate on the truck when the car runs along the track. In this capacity, the engaging ring 39 serves also to relieve the body of abrasion by the rail 41.

Figures 8, 9:
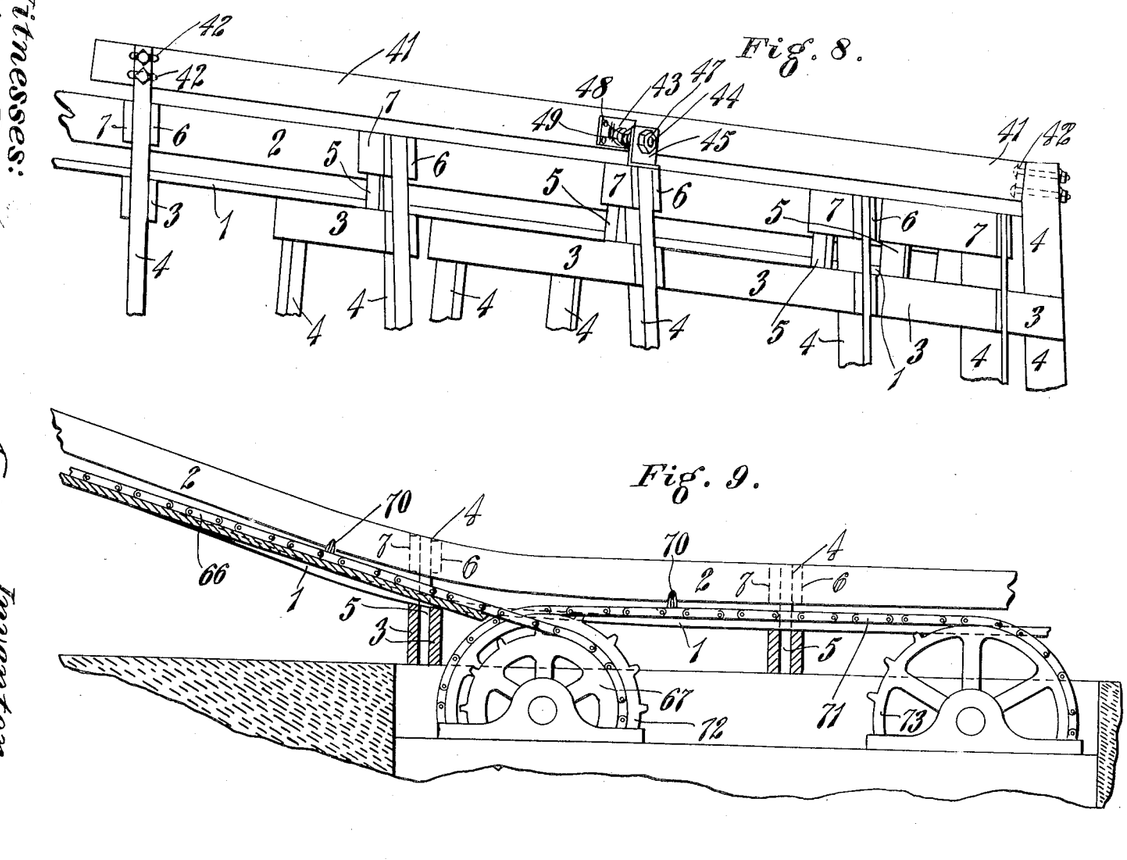
Fig. 8 is an enlarged side elevation of one of the rails for rotating the passenger carrying body of the car.
Fig. 9 is an enlarged side elevation of an elevator suitable for use in the operation of my invention.
Figure 10:
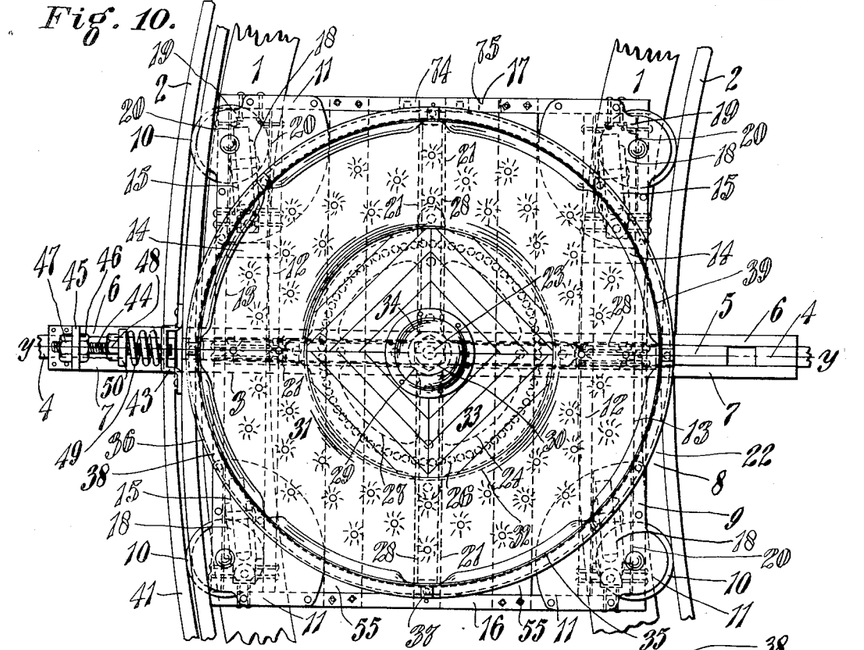
Fig. 10 is an enlarged plan view of one of the cars and part of the track illustrating the action of the rail in rotating the passenger carrying body.
Figure 11:
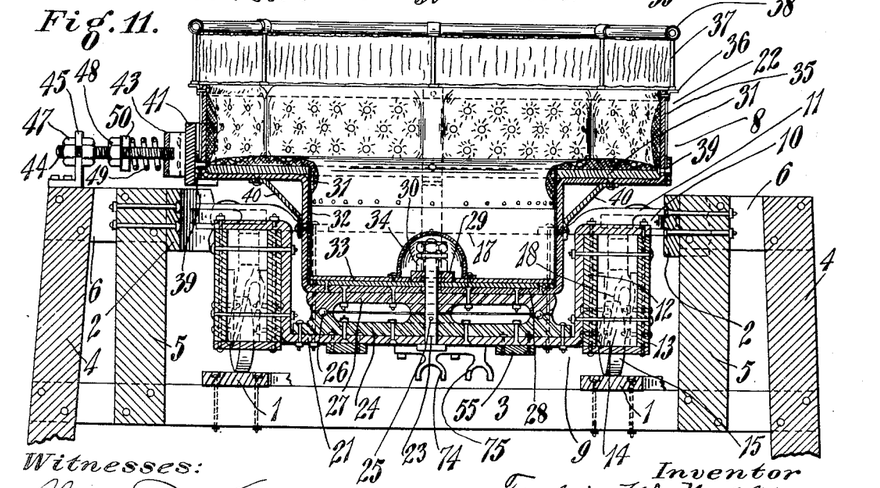
Fig. 11 is a section on a line corresponding to y—y of Fig. 10.

The rail 41 is composed of a flexible strip movably supported near its ends, such as by bolts passing through slots 42 in it, the bolts being secured in extensions of the posts 4. Near the middle of this flexible strip, secured on its side away from the track, is a socket 43, and a screw 44, rigidly mounted in a bracket 45 by means of nuts 46 and 47, has a projection into the socket 43, so that a guide is thus constituted for the middle part of the flexible strip, confining it to movement transversely of the track. An adjusting nut 48 works on the threads of the screw 44 between the bracket 45 and the socket 43, and interposed between this adjusting nut 48 and the socket, is a spiral spring 49 having a suitable washer 50 in engagement with the nut 48. The bracket 45 is rigidly secured to the top of one of the posts 4.

The track composed of the supporting rails 1 and guiding rails 2 and their supporting members comprised by the beams 3, posts 4 and 5 and braces 6 and 7, is constructed in the form of a series of alternately disposed curves, joining at tangents, the curves conforming substantially to arcs of circles, so that the track is sinuous in transverse conformation. The sinuations of the track thus formed preferably lie in substantially a single plane which is inclined from the beginning of the first of the above described curves to the end of the last one. The track thus sinuated and inclined, while continuously guiding the car by means of the guiding rails 2 and the guiding wheels 10 on the truck of the car, will allow the car to bear heavily toward the lower side of each curve, and it is at these parts of the curves that the flexible strips or rails 41 are located. These flexible strips do not conform to the curves of the track, but form curves conforming substantially to arcs of greater radius than, and eccentric to, the curves of the track, with their end parts held outside the track on the extensions of the posts 4, away from contact with the cars 8, and with their middle parts held inside the track by means of the adjusting nut 48 on the screw 44, so that the middle parts of the rails will engage their inner surfaces with the convex surfaces of the engaging rings 39 on the passenger carrying bodies 22 of the cars 8 when they pass around the lower parts of the curves. By means of the adjusting nuts 48, and permitted by the movable attachment of the end parts of the flexible strips or rails 41, the middle parts of these rails may be adjusted outwardly or inwardly, laterally of the track, to increase or decrease the degree of engagement of the rail with the engaging ring of the car. The middle part of the rail being yieldable, owing to its flexibility and to the yieldable support afforded by the spring 49, the adjustment of the middle part of the rail inwardly of the track will serve to increase the friction between the inner surface of the rail and the convex surface of the engaging ring without proportionately increasing the abruptness and violence of contact of the car with the rail, owing to the fact that the inner surface of the rail extends tangentially of the convex surface of the engaging ring of the car, allowing the ring to engage gradually with the rail as the car advances, and allowing the shock to be gradually absorbed, due to the flexibility of the rail and the spring 49 supporting it.

Since the curves to which the track conforms are alternately disposed, the placing of the flexible strips or rails on the lower sides of these curves results in the disposition of the flexible strips or rails on alternate sides of the track, so that the passenger carrying body of the car 8 will be engaged on alternate sides, as the car passes around successive curves in traveling down the inclined track from the higher part to the lower part, transmitting alternate rotation to the passenger carrying body of the car. Owing to the fact that only a relatively small proportion of the length of the flexible strip or rail is projected inside the track for engagement with the engaging ring of the body of the car, these alternate rotations of the body will be intermittent, with considerable periods of time between the engagements and incidental reversals of the rotation of the body. Therefore, the body being adapted to rotate readily on the truck by means of the bearing rings and balls between the bearing rings, an agreeable uniform rotation of the passenger carrying body to the extent of several revolutions will be caused, during the periods of time between the intermittent engagements of the flexible strips or rails with the engaging rings of the body, terminated by a gradual reduction of the speed and reversal of the rotation, producing a sensation for the passengers, novel and exhilarating, and at the same time without uncomfortable jolting. The truck of the car, with its caster wheels 15 bearing on the relatively broad supporting rails 1, and with its guiding wheels 10 bearing on the relatively broad guiding rails 2, continuously guided by the track in this manner, forms a thoroughly safe conveyance for the passengers, while the passenger carrying body, with the relatively broad bearing afforded by the bearing rings with the balls between them and securely held down to the truck by the pivot pin 23, affords the means of producing the desired novel sensation without decreasing the safety of the vehicle afforded by the efficient guidance of the truck by the track.

Figures 1, 2:
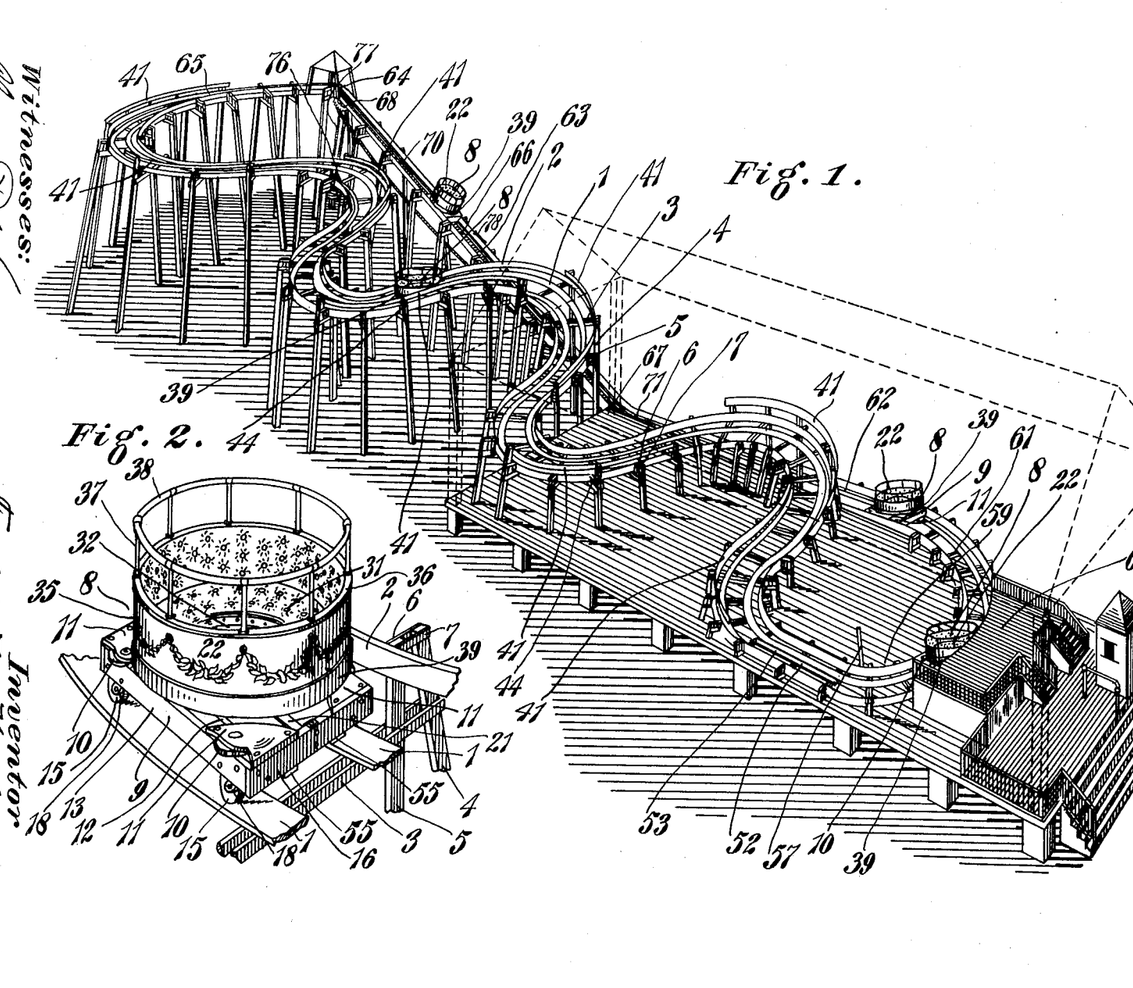
Figure 1 is a general perspective view of a construction embodying my invention.
Fig. 2 is a perspective view of one of the cars and part of the track.
Figure 3:
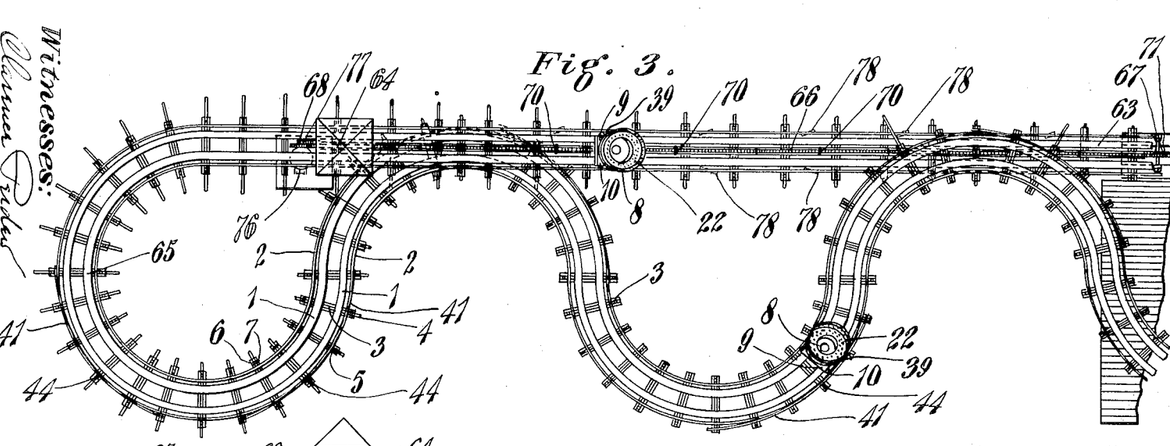
Figure 4:
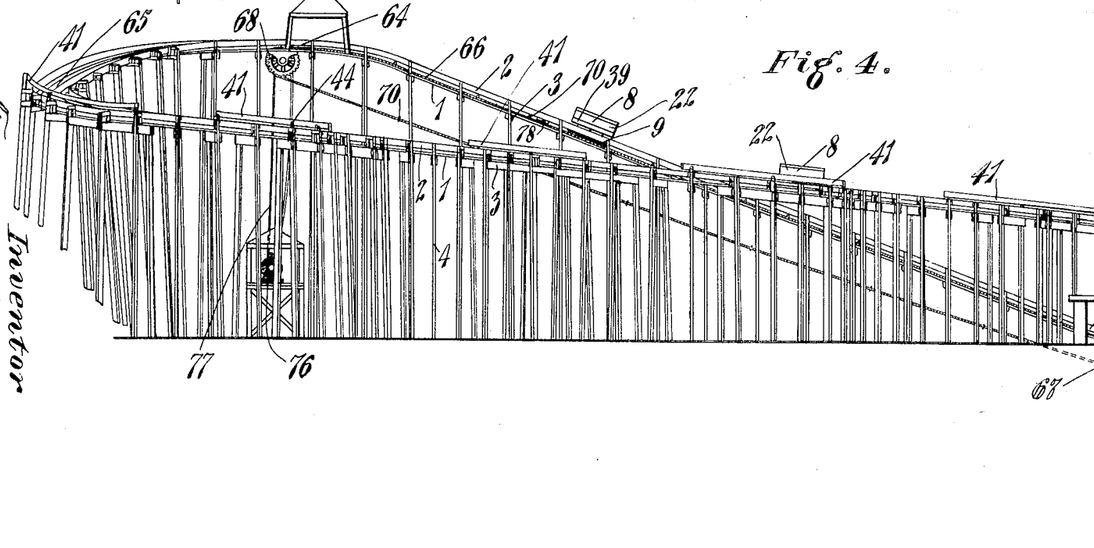
Figures 5, 6:
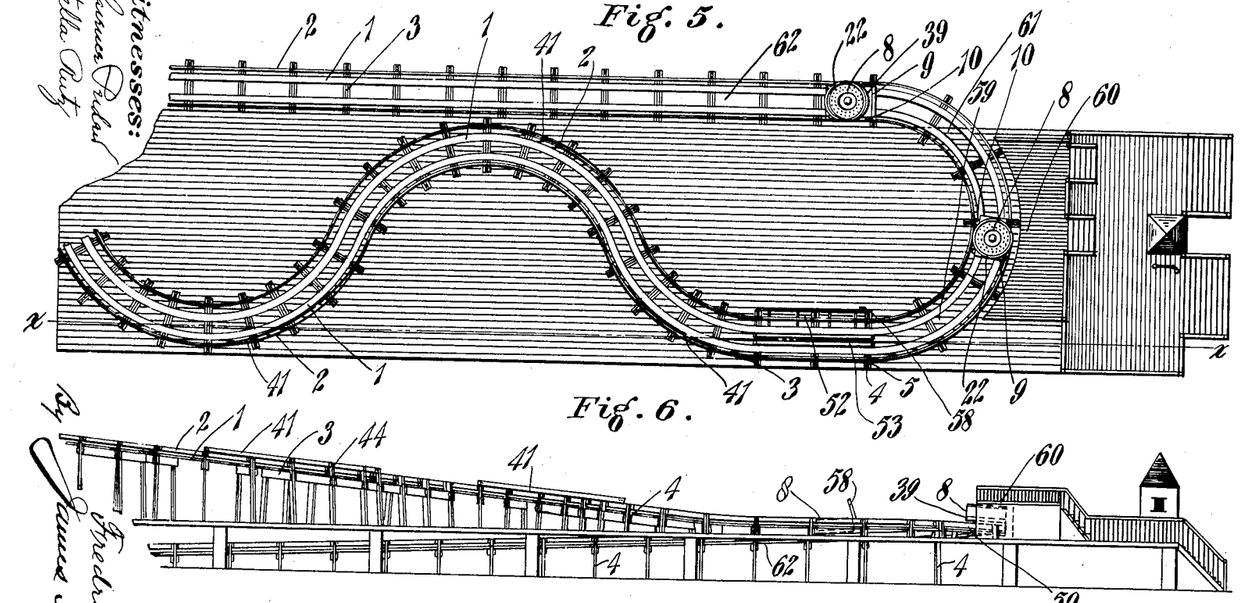
Figure 7:
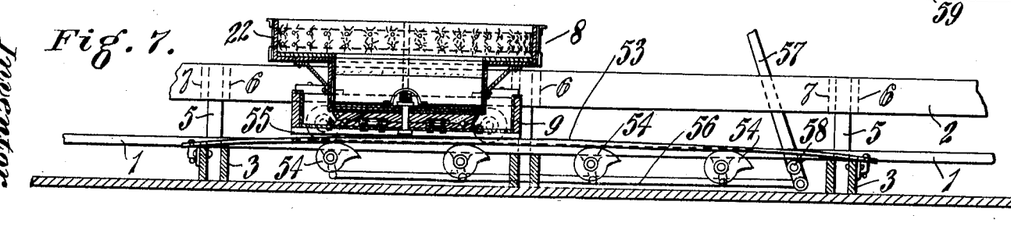
Fig. 7 is an enlarged sectional view on a line corresponding to x—x of Fig. 5, better illustrating the construction of a brake suitable for use with my invention, the view also including a section of one of the cars.

The truck, continuously guided and having its position maintained uniform with respect to the track along which it travels, is especially adapted for the use of simple and efficient speed reducing means, and an efficient and safe elevator for raising the car from the low to the high part of the track. For reducing the speed of the car after it has passed the last flexible strip or rail, a brake 52 is located along a short straight part of the track, continuing from the last and lowest curve, which brake comprises flexible rails 53 movably secured near their ends to the beams 3 and having a series of shoes 54 mounted under them, the shoes being rotatable and of such shape that when they are rotated they will raise the middle parts of the flexible rails 53 to engage with corresponding strips 55 on the bottom of the truck frame, extending from the front to the rear thereof. The rotation of the shoes 54 is accomplished by means of a connecting rod 56 pivoted to cranks on the shoes and to the lower end of a lever 57 which fulcrums on a pivot 58 secured rigidly in fixed position with respect to the track. The brake 52, constructed as above described, by frictionally engaging its flexible rails 53 with the strips 55 on the bottom of the truck, will effectually reduce the speed of the car, and when the rails 53 are again lowered, the car will pass out of the straight part of the track where the brake 52 is located, around a curve 59 and alongside a platform 60, the surface of which is of sufficient height to allow the passengers to step down into the passenger carrying body 22, over the hand rail 38.

The part of the track along the curve 59, and adjacent to the platform 60, is level, so that cars will remain stationary, but near the end of the platform 60 the track again inclines downward and around a curve 61 to a straight part 62 which continues to incline downward and terminates where the track takes a relatively steep upward inclination at 63. The track thus continues steeply inclined upward, and in a straight direction, to the point 64, where the track is again curved and inclined downward to the beginning of the first curve forming the sinuated track at 65.

For carrying the car from the point 63, where the track begins to incline steeply upward, to the point 64, where the track again begins to curve and incline downward, an elevator, comprising a sprocket chain 66 carried on sprocket wheels 67 and 68, located, respectively, at the lower and upper end of the steeply inclined part of the track, and having cross pieces 70 rigidly secured thereon, is provided. This sprocket chain 66 is supplemented by a sprocket chain 71 carried on sprocket wheels 72 and 73, the sprocket wheel 72 being mounted on the same shaft as is the sprocket wheel 67. This chain operates along the part of the track immediately preceding the steeply inclined part and also has cross pieces 70, while the trucks of the cars are provided with downwardly extending forks 74 and 75 to embrace the sprocket chains 66 and 71, respectively, and be engaged by the cross pieces 70 thereon. A motor 76 is mounted on a platform under the track and transmits motion to the sprocket wheel 68 by means of a sprocket chain 77. The elevator is provided with trips 78 adapted to fall behind the truck of the car as it ascends the track, to guard against falling of the car in case of breakage of the sprocket chain or disengagement of the fork 74. It will be understood that this elevator, as well as the speed reducing means which is hereinbefore described in considerable detail, may have suitable well known equivalents, it only being herein intended to note that the continuously guided truck, maintained in uniform position relative to the track, is especially adapted for use with such speed reducing means and elevators, affording great convenience in operation of the device and a close approach to absolute safety to the passengers.

It will also be understood that the various other details herein specifically described, may be varied to adapt my invention for use under different conditions, so far as such variations do not depart from the scope and spirit of my invention.

In view of this, and having fully described my invention, what I claim as new and desire to secure by Letters Patent is:

1. In an amusement device, a truck, a body rotatably mounted on the truck, a track for the truck to run on provided with means for maintaining the position of the truck with respect to the track, a curved rail eccentric to the curve of the track and adapted to engage with the body to rotate it when the truck runs around the curve, and means for adjusting the eccentricity of the rail with respect to the curve of the track, substantially as and for the purposes specified.

2. In an amusement device, a truck, a body rotatably mounted on the truck, a track for the truck to run on provided with means for maintaining the position of the truck with respect to the track and having a curve around which the truck is caused to run, and a yieldable curved rail eccentric to the curve of the track, adapted to engage with the body to rotate it when the truck runs around the curve, substantially as and for the purposes specified.

3. In an amusement device, a truck, wheels on the truck adapted to revolve in a plane substantially vertically of the truck, and mounted to swing laterally of the truck, wheels on the truck adapted to revolve in a plane substantially horizontally of the truck, and to present their peripheries laterally thereof, supporting rails on which the laterally swinging wheels are adapted to roll, guiding rails against which the laterally presented peripheries are adapted to bear, supporting members adapted to maintain the supporting rails and the guiding rails in fixed position with respect to each other, a centrally pivoted circular passenger carrying body on the truck, and a rail yieldably and adjustably mounted on the supporting members to engage with the convex surface of the circular body to rotate it, substantially as and for the purposes specified.

4. In an amusement device, a truck, a passenger carrying body rotatably mounted on the truck and having a convex surface, a track comprising supporting rails, guiding rails and supporting members for maintaining the supporting rails and guiding rails in fixed position with respect to each other, said supporting rails and guiding rails being curved to support the truck and guide it in a curved direction, wheels on the truck adapted to roll on the supporting rails, and wheels on the truck adapted to bear on the guiding rails, a rail mounted adjacent to one of the curved guiding rails and eccentric thereto, whereby it is adapted to engage with the convex surface of the body, having its ends movably secured on the supporting members and being flexible between its ends, a bracket on one of the supporting members between the ends of the flexible rail, a screw supported by the bracket, a nut on the screw for adjusting the eccentricity of the flexible rail with respect to the guiding rail, and a spring interposed between the nuts and the rail, whereby it is allowed to yield between its ends when it engages with the convex surface of the passenger carrying body, substantially as and for the purposes specified.

5. In an amusement device having a track provided with supporting rails and laterally disposed guiding rails, a car having a truck frame, wheels on the truck frame adapted to bear on the supporting rails of the track and wheels on the truck frame adapted to bear on the laterally disposed guiding rails of the track, a bearing ring supported within the truck frame, a passenger carrying body having a lower circular part lying within the truck frame, a bearing ring on the bottom of the lower circular part of the body, balls between the bearing ring mounted within the truck frame and the bearing ring mounted on the bottom of the lower circular part of the body, a pivot pin concentric with the bearing rings and holding them together, an upper enlarged circular part to the body extending laterally over the truck frame, an engaging ring extending around the upper enlarged circular part of the body, and forming a reinforcement therefor, and a rail adjacent to one of the guiding rails of the track, adapted to engage tangentially with the engaging ring on the upper enlarged part of the body to rotate the passenger carrying body when the car runs along the track, substantially as and for the purposes specified.

6. In an amusement device, a track, a car adapted to run on the track, and having a rotatable passenger carrying body, an inelastic engaging ring on the body, and a yieldable rail on the track adapted to engage with the engaging ring, whereby the body may be rotated when the car runs on the track, substantially as and for the purposes specified.

7. In an amusement device, a truck, a passenger carrying body rotatably mounted on the truck, a track for the truck to run on provided with means for continuously guiding the truck, a rail adjacent to the track adapted to engage with the body to rotate it when the car runs on the track, the rail being flexible and being movably supported near its ends, a socket on the rail between its ends, a bracket rigidly supported in fixed position with respect to the track, a screw supported by the bracket and having a projection into the socket, a nut adjustable on the screw, and a spring interposed between the nut and the socket, whereby the flexible rail is rendered adjustable and yieldable, substantially as and for the purposes specified.

8. In an amusement device, a track having a high and a low part, a truck adapted to run on the track from the high to the low part, the track being provided with an elevator adapted to raise the truck from the low to the high part of the track and means for reducing the speed of the truck when it approaches the low part of the track, and a passenger carrying body rotatable on the truck, the track being provided with means for engaging the body to rotate it when the truck runs on the track, the truck being continuously guided and adapted to be controlled by the speed reducing means and the elevator, and the body being rotatable independently of the action of the speed reducing means and the elevator, substantially as and for the purposes specified.

9. In an amusement device, a track having a high part and a low part, a car adapted to run on the track from the high part to the low part, means for reducing the speed of the car when it approaches the low part of the track, and an elevator for raising the car from the low part to the high part of the track, the car having an alternately rotatable passenger carrying body and being adapted to be continuously guided by the track and be controlled by the speed reducing means and the elevator without interfering with the rotation of the passenger carrying body, substantially as and for the purposes specified.

10. In an amusement device, an inclined track, a car adapted to run on the inclined track, and having a rotatable passenger carrying body and means for gradually engaging the body to rotate it and to reverse its rotation, when the car runs on the inclined track, substantially as and for the purposes specified.

11. In an amusement device, an inclined track, a car adapted to run on the inclined track, a rotatable passenger carrying body on the car, the car being adapted to be continuously guided by the track, and means for continuously guiding the car on the track and for intermittently, alternately and gradually engaging the body to rotate it and to reverse its rotation, substantially as and for the purposes specified.

12. In an amusement device, a car comprising a truck frame with supporting wheels and guiding wheels, and a bearing ring within the truck frame, a second bearing ring, and balls between the bearing rings, a pivot pin concentric with the bearing rings to hold them together, radially extending braces uniformly bent to form the frame work of a passenger-carrying body, seats of circular formation supported on the laterally extending braces, an engaging ring surrounding the braces and rigidly secured thereto, a track for the car to run on, adapted to continuously guide the car, and a rail adjacent to the track adapted to engage with the engaging ring, said engaging ring being inelastic, whereby it forms a rigid reinforcement for the passenger carrying body, and the rail being yieldable, whereby it forms means for gradually rotating the body, substantially as and for the purposes specified.

13. In an amusement device, a track, a car adapted to run on the track and having a rotatable passenger carrying body, an inelastic ring surrounding the body and adapted to reinforce it, and a yieldable rail adjacent to the track adapted to engage with the inelastic ring and gradually rotate the body, substantially as and for the purposes specified.

FREDRIC W. NALL.

Witnesses:
EDWIN B. NALL,
JAMES NALL.